United States Patent [19]

Mashimo

[11] Patent Number: 5,283,774
[45] Date of Patent: Feb. 1, 1994

[54] OPTICAL DISK STORAGE HAVING FOCUS SERVOCONTROL SYSTEM IN ACCORDANCE WITH ASTIGMATISM METHOD

[75] Inventor: Akira Mashimo, Tokorozawa, Japan

[73] Assignee: TEAC Corporation, Japan

[21] Appl. No.: 764,711

[22] Filed: Sep. 24, 1991

[30] Foreign Application Priority Data

Sep. 28, 1990 [JP] Japan .................................. 2-259238

[51] Int. Cl.⁵ ............................................. G11B 7/095
[52] U.S. Cl. ........................... 369/44.320; 369/44.350; 369/44.410; 369/54; 369/116
[58] Field of Search ............... 369/44.25, 44.27, 44.29, 369/44.32, 44.34, 44.35, 44.41, 54, 116; 250/201.5

[56] References Cited

U.S. PATENT DOCUMENTS

| | | |
|---|---|---|
| 4,819,220 | 4/1989 | Miyazaki et al. ................. 369/50 X |
| 5,097,458 | 3/1992 | Suzuki ........................ 369/44.29 X |
| 5,142,520 | 8/1992 | Yanagi et al. ................ 369/44.32 X |
| 5,148,423 | 9/1992 | Gleim ............................. 369/44.29 |

Primary Examiner—W. R. Young
Attorney, Agent, or Firm—Andrus, Sceales, Starke & Sawall

[57] ABSTRACT

An optical disk storage has a focus servocontrol system in accordance with an astigmatism method. Thus, the optical disk storage uses a cylindrical lens and a photosensor. The optical disk storage corrects an error generated by a light amount distribution offset of an optical beam to be radiated on the photosensor used for the focus servocontrol, so that a normal control signal can be generated and the recording/reproducing performance of the optical disk storage does not deteriorate. The optical disk storage calculates an offset amount between a center of the light amount distribution of the optical beam radiated on the radiation surface of the photosensor and a center of the photosensor.

13 Claims, 9 Drawing Sheets

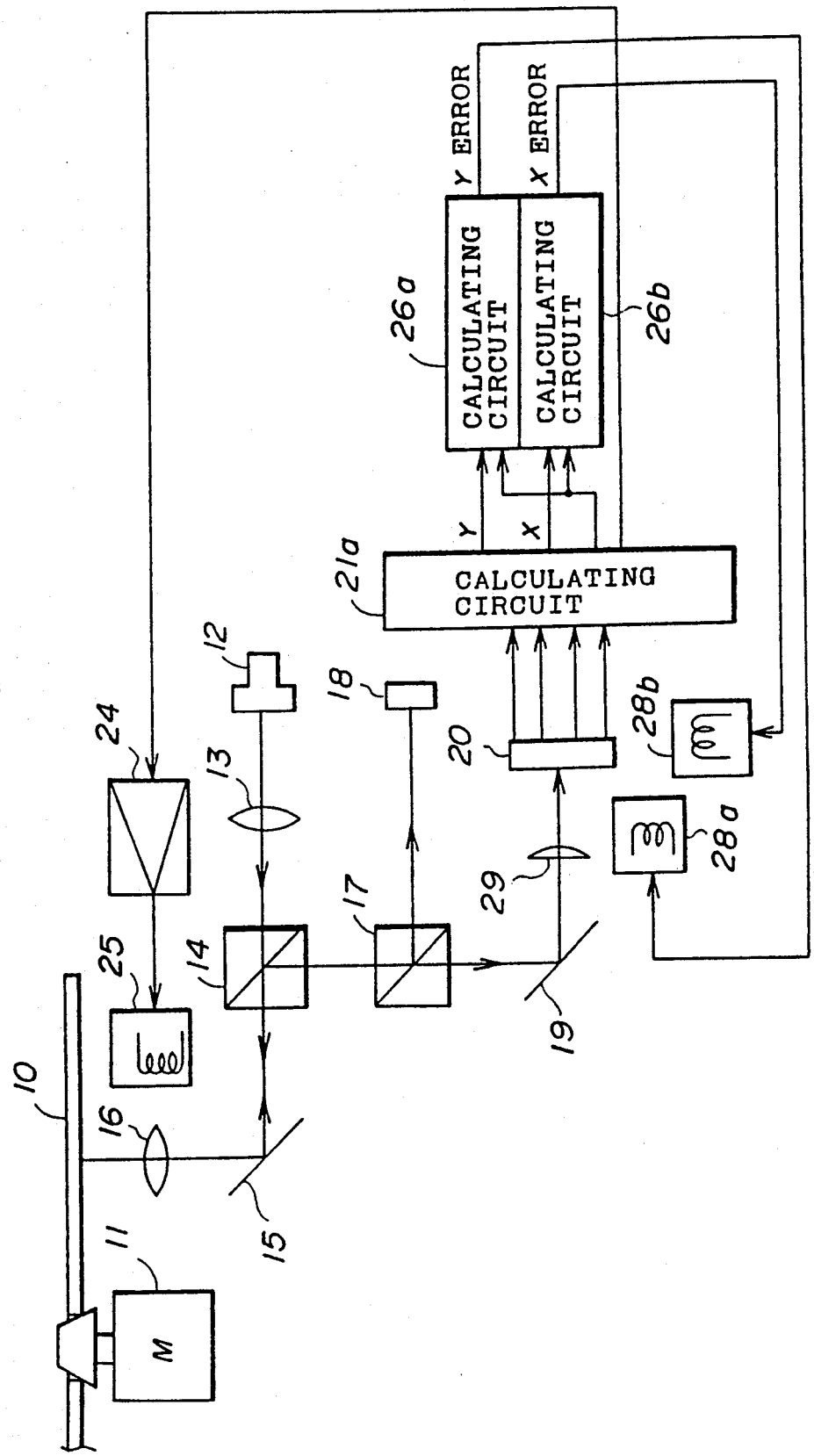

OPTICAL DISK STORAGE HAVING FOCUS SERVOCONTROL SYSTEM IN ACCORDANCE WITH ASTIGMATISM METHOD

BACKGROUND OF THE INVENTION

The present invention relates generally to optical disk storages having a focus servocontrol system in accordance with an astigmatism method.

An optical regenerative disk storage which reproduces a so-called compact disk (CD) has been well-known. In addition, a rewritable optical disk has also been well-known.

In a recording and/or reproducing apparatus (abbreviated optical disk storage hereinafter) used for such an optical disk, an optical beam focused by an objective lens emitted from optical beam generating means is radiated on a recording surface of the optical disk. The optical beam reflected on the recording surface of the optical disk is received by a reading sensor to reproduce data. The data may be recorded on the recording surface of the optical disk by radiating the optical beam thereon. In order for the desired recording/reproducing, it is necessary to very precisely focus an optical beam on the recording surface.

The optical beam is accessed at an arbitrary area on the recording surface of the rotating optical disk, and thus data is recorded and/or reproduced.

The recording surface of the optical disk vibrates upwardly and downwardly when the optical disk is rotated by the optical disk storage because of a deflection of the optical disk and an offset of a rotating shaft caused by a mechanical error generated when they are manufactured. It is necessary to move the optical beam generating means and the objective lens so as to make a focused optical beam follow the recording surface on the optical disk.

Such a control method in which the optical beam generating means and the objective lens are moved so as to follow the recording surface of the optical disk is one of the well-known focus servocontrol methods. The astigmatism method is among the focus servocontrol methods.

This astigmatism method uses a cylindrical lens, one surface of which is a plane and the other surface of which is a cylinder. A description of the characteristic of the optical beam passed into the lens will now be given. The optical beam having a circular section orthogonal to an optical axis, which beam has passed through a conventional lens, is focused after it passes through the cylindrical lens. The section orthogonal to the optical axis of the optical beam passed through the cylindrical lens has an elongated ellipse, in the vicinity of the cylindrical lens, which extends along a center shaft of the cylinder surface of the cylindrical lens. Then the section, which is apart from the cylindrical lens, gradually becomes a perfect circle and then becomes an ellipse in which the position of a long axis and a short axis are reversed.

The astigmatism method uses the above characteristic of the optical beam passed through the cylindrical lens by locating the cylindrical lens at a pupil point where the optical beam reflected on the recording surface of the optical disk is focused via the objective lens. Moreover, a photosensor used for the focus servocontrol is provided at a position where the section orthogonal to the optical axis of the optical beam becomes a perfect circle so that the optical beam passed through the objective lens can be focused on the recording surface of the optical disk.

Then, as the optical disk is rotated and the recording surface is vibrated, the optical beam focused via the objective lens is deviated from the recording surface toward the optical axis. The distance between the recording surface and the photosensor changes. On the other hand, the optical beam has reflected on the recording surface and passed through the objective lens and the cylindrical lens. Thus, the section of the optical beam on the photosensor is transformed from a perfect circle to an ellipse.

The photosensor used for the focus servocontrol comprises, as shown in FIG. 1A, four detecting parts a to d which are respectively made by dividing a quadrate into four equal parts. Each of these detecting parts a to d comprises a light receiving element for generating an output in proportion to the received light amount. The photosensor is located so that the center shaft of the optical beam passed through the cylindrical lens can correspond to an intersecting (center) point 0 of the respective detecting parts a to d.

If the optical beam focused via the objective lens is radiated on the recording surface of the optical disk, as shown in FIG. 1B, the optical beam has a perfectly circular section on the photosensor used for the focus servocontrol. Since the recording surface of the optical disk vibrates, if the recording surface moves upwardly and thus the distance between the optical beam generating means and the photosensor used for the focus servocontrol becomes longer, the optical beam has an elliptic section whose left side is biased as shown in FIG. 1C. On the other hand, if the recording surface moves downwardly, the optical beam has an elliptic section whose right side is biased, as shown in FIG. 1A.

A circuit connected subsequent to detecting parts a to d in the photosensor used for the focus servocontrol calculates a focus error by subtracting the sum of the outputs of the detecting parts a and c from the sum of the outputs of the detecting parts b and d. A control signal is generated based on this focus error.

The control signal becomes positive in the state shown in FIG. 1A, becomes zero in the state shown in FIG. 1B, and becomes negative in the state shown in FIG. 1C. In addition, the more the recording surface vibrates, the larger the difference between the long radius and the short radius of the ellipse shown in FIG. 1A or 1C becomes and thus the larger the value of the control signal becomes.

Thus, the control signal represents the detected vibration amount of the recording surface of the optical disk. The focus servosystem moves the optical beam generating means and the objective lens in accordance with the detected vibration amount. The position of the focused optical beam passed through the objective lens is adjusted so that the optical beam can be focused on the recording surface of the optical disk. That is, focus servocontrol is achieved.

Each mechanism in the optical disk storage is deflected due to the passing of time, surrounding temperature and change of humidity, etc. The center shaft of the optical beam radiated on the photosensor is gradually deviated from the center point 0, the intersecting point of the respective detecting parts a to d of the photosensor, even if it has initially corresponded thereto, because of the above causes, as shown in FIGS. 1D to 1F. The optical beam, which has been reflected on the recording surface and passed through the objective lens, has a perfectly circular section, as shown in FIGS. 1D to 1F, on the photosensor used for the focus servocontrol if the optical beam is precisely focused on the recording surface of the optical disk.

However, since the center of the circle on the radiated surface of the optical beam does not correspond to the intersecting point 0 of the respective detecting parts a to d, the difference between the sum of the outputs of the detecting parts a and c and that of the outputs of the detecting parts b and d, which should have been zero, cannot become zero. Thus the control signal includes an error. The control signal moves the objective lens upwardly and/or downwardly so as to compensate for the error of the control signal by assuming that the optical beam focused by the objective lens has been deviated from the recording surface. As a result, the focus of the optical beam on the recording surface, which originally corresponds to the recording surface, never corresponds thereto.

The ideal light amount distribution at the section orthogonal to the center shaft of the optical beam is equal to that on the concentric circle having the center corresponding to the center shaft. The ideal light amount distribution at the section orthogonal to the center shaft of the optical beam is deflected by mechanical deflection of each lens to control the generating and focusing of the optical beam, the deflection being caused due to the passing of time, temperature, change of humidity, etc.

Therefore, even if the center shaft of the optical beam corresponds to the intersecting point 0 of the respective detecting parts a to d, no focus offset is generated by the deflected light amount distribution of the section orthogonal to the center shaft of the optical beam and the optical beam has a perfectly circular section, each of the detecting parts a to d of the photosensor respectively receives a different light amount. Thus the control signal includes an error. A term "center error", as used herein, is a general term for an error of the biased optical amount distribution and that of the center shaft.

As a result, the center shaft of the optical beam radiated on the photosensor is deviated from the intersecting point 0 of the respective detecting parts a to d, so that the focus of the optical beam on the recording surface, which originally corresponds to the recording surface, never corresponds thereto.

Such a phenomenon makes the focused optical beam always deviate from the recording surface of the optical disk, and thus the optical energy radiated on the area to be accessed on the recording surface cannot reach the predetermined amount. Thus, recording/reproducing performed by the optical disk storage deteriorates.

SUMMARY OF THE INVENTION

Accordingly, it is a general object of the present invention to provide an optical disk storage in which the above disadvantage is eliminated.

Another object of the present invention is to provide an optical disk storage which corrects an error generated by the light amount distribution offset of the optical beam to be radiated on the photosensor used for the focus servocontrol, so that a normal control signal can be generated and the recording/reproducing performance of the optical disk storage does not deteriorate.

Still another object of the present invention is to provide an apparatus having a function for correcting an error of the control signal by calculating an offset amount between a center of the light amount distribution of the optical beam radiated on the photosensor used for the focus servocontrol and a center of the photosensor.

A further object of the present invention is to provide an apparatus having a function for correcting an error of the control signal by calculating the center error based on respective biased amounts of a light amount distribution of an optical beam in a first direction and a second direction opposite to the first direction.

Another object of the present invention is to provide an apparatus performing a desired focus servocontrol based on the control signal in which the center error is corrected.

Still another object of the present invention is to provide an apparatus which achieves desired recording-/reproducing performance by controlling optical beam generating means based on the offset of the light amount distribution to compensating the shortage of the optical beam for be radiated on the recording surface of the optical beam caused by the center error.

The further object of the present invention is to provide an apparatus which corrects the offset of the light amount distribution by adjusting an angle of a mirror for introducing the optical beam to the photosensor used for the focus servocontrol in accordance with the center error and changing a direction of the optical beam.

The another object of the present invention is to provide an apparatus which corrects the offset of the light amount distribution by adjusting a position of the photosensor used for the focus servocontrol in accordance with the center error and correcting the offset of the light offset distribution.

Other objects and further features of the present invention will become apparent from the detailed description when read in conjunction with the accompanying drawings.

BRIEF DESCRIPTION OF THE DRAWINGS

FIG. 9 shows a block diagram of an apparatus of the fourth embodiment according to the present invention.

DETAILED DESCRIPTION OF THE PREFERRED EMBODIMENTS

Figure 2:
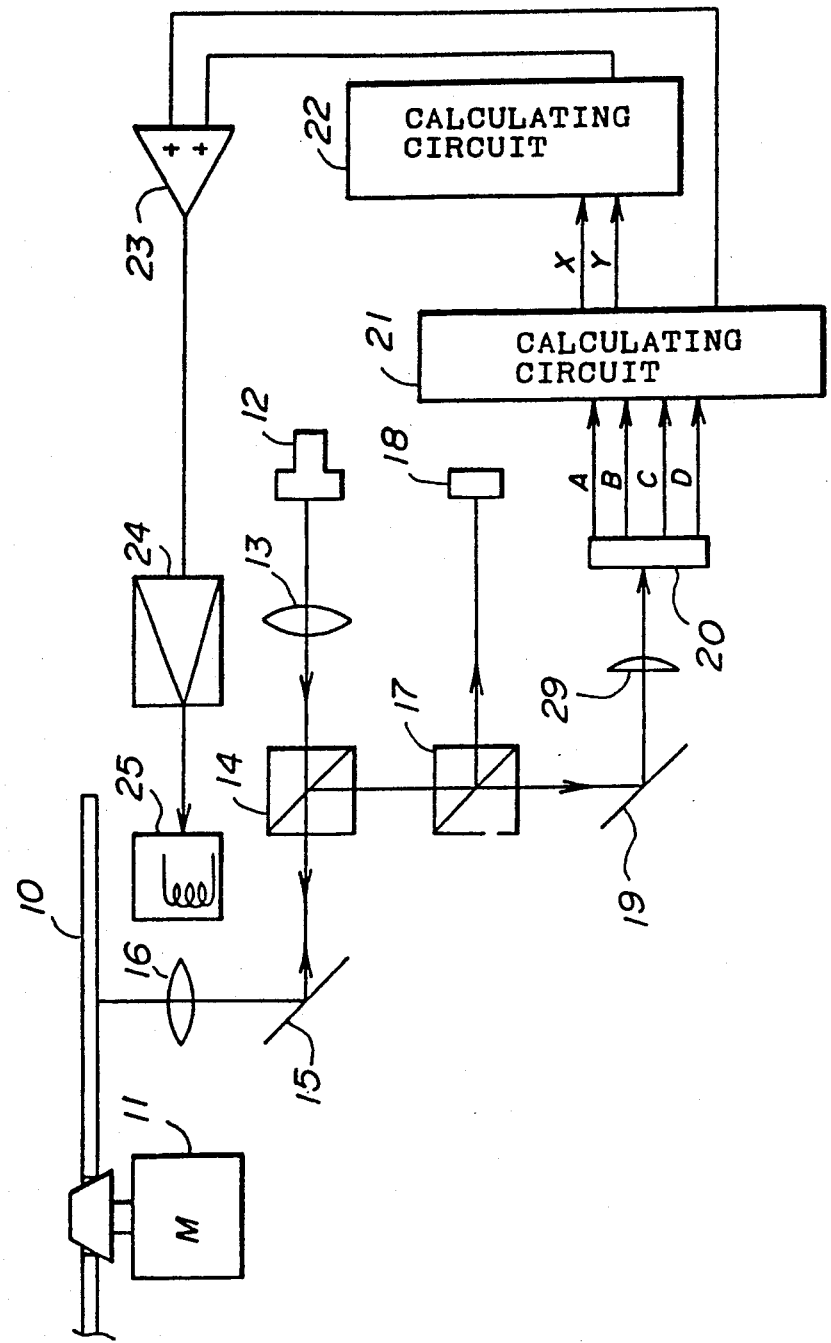
FIG. 2 shows a block diagram of an apparatus of the first embodiment according to the present invention.

FIG. 2 shows a systematic block diagram of the optical disk storage according to the present invention.

The optical disk storage 100 shown in FIG. 2 has a laser diode 12 corresponding to optical beam generating means which generates an optical beam having light energy in proportion to the supplied driving current. The optical beam emitted from the laser diode 12 is transformed as a parallel beam by a collimator lens 13, and reflected on a beam splitter 14 via a tracking mirror 15 to input it into an objective lens 16. The incident optical beam input into the objective lens 16 is focused on the recording surface of the optical disk rotated by a spindle motor 11.

The optical beam is focused on the recording surface of an optical disk 10 and then reflected thereat to input it into the tracking mirror 15 and the beam splitter 14 via the objective lens 16. Then the optical beam is directed into a beam splitter 17.

Most of the light amount of the incident optical beam directed into the beam splitter 17 is reflected thereby and then directed to a reading out photosensor 18. Further, the data, which has been recorded on the optical disk 10 and included in the optical beam, is read out by the reading photosensor 18 to be converted into an electric signal.

In order for the desired recording/reproducing, the optical beam is very precisely focused on the recording surface of the optical disk 10.

But the recording surface vibrates, as the optical disk 10 rotates, because of the mechanical deflections of the optical disk and/or the rotation shaft arising from manufacturing. In order for the optical beam not to be deviated from the recording surface on the optical disk, the objective lens 16 must be made to follow the recording surface of the optical disk by moving it upwardly and/or downwardly in synchronization with the recording surface.

The present invention adopts the aforementioned astigmatism method among the focus servocontrolling methods in order to move the objective lens 16 in synchronization with the recording surface of the optical disk 10.

The incident optical beam directed into beam splitter 17 partially penetrates the beam splitter 17, is directed to a mirror 19, and then input to the cylindrical lens 29 via the mirror 19. The incident optical beam directed into the cylindrical lens 29 is focused thereby and then radiated on a photosensor 20 used for the focus servocontrol.

The cylindrical lens 29 is located at a pupil point where the optical beam reflected on the recording surface of the optical disk is focused via the objective lens. The section orthogonal to the optical axis of the optical beam passed through the cylindrical lens has an elongated ellipse, in the vicinity of the cylindrical lens, which extends along a center shaft of the cylinder surface of the cylindrical lens. Then the section apart from the cylindrical lens gradually becomes a perfect circle and then becomes an ellipse in which the positions of a long axis and a short axis are reversed. The astigmatism method uses the above characteristic of the optical beam passed through the cylindrical lens.

Figure 3A:
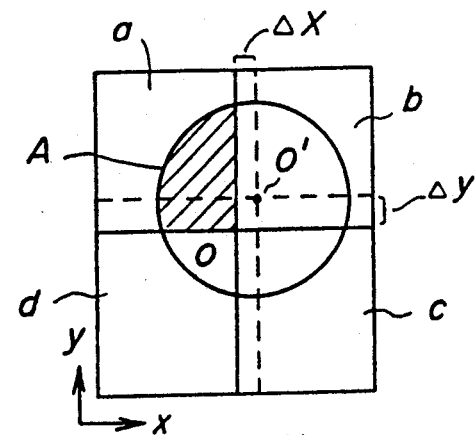
FIGS. 3A to 3C respectively show views of the radiated surfaces of the optical beam radiated on the detecting parts on the photosensor.
Figure 3B:
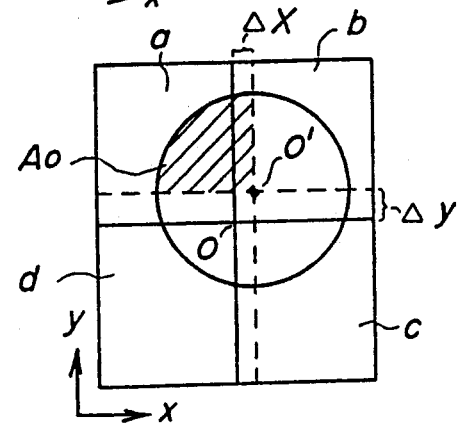
Figure 3C:
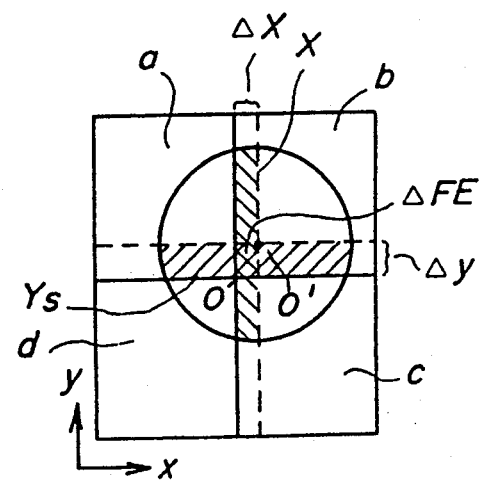

The photosensor 20 used for the focus servocontrol comprises, as shown in FIGS. 3A to 3C, four quadrate detecting parts a to d. The optical beam radiated on the four detecting parts a to d on the photosensor 20 used for the focus servocontrol is converted into an electric signal to be input into a calculating circuit 21. The calculating circuit 21 outputs a result of the calculating process to calculating circuits 22 and 23. After the calculating circuit 22 further calculates the result, the calculating circuit 22 outputs the result to the calculating circuit 23.

The circuits 21 to 23, which respectively operate the aforementioned focus servocontrol, generate a control signal based on the focus error corresponding to the offset amount of the optical beam focused on the recording surface of the optical disk 10.

In addition, the circuits 21 to 23 output a control signal in which the error generated from the light amount distribution offset of the optical beam radiated on the photosensor 20 is corrected.

The output control signal of the calculating circuit or adder 23 is amplified by an amplifier 24, and then supplied to an objective lens driving coil 25. The control signal has no error generated from the light amount distribution offset. Accordingly, the objective lens driving coil 25 moves the objective lens so that the offset of the optical beam focused on the recording surface of the optical disk 10 can be corrected.

Incidentally, the laser diode 12, collimator lens 13, beam splitters 14 and 17, tracking mirror 15, objective lens 16, photosensors 18 and 20, rotating servosystem and tracking servosystem can be respectively comprised of the conventional elements, and thus a further description thereof will be omitted.

A description will now be given of the principal of the present invention.

FIGS. 3A to 3C respectively show views in which the center shaft of the optical beam is located at a point 0' deviated from the intersecting point 0 of the respective detecting parts a to d by $\Delta x$ in a direction x and by $\Delta y$ in a direction y.

The respective detecting parts a to d generate outputs in proportion to the radiated light energy. The light energy included in the optical beam to be radiated on the detecting parts a to d shown in FIGS. 3A–3C is approximately proportional to the area of the section orthogonal to the center shaft. In this embodiment, it is assumed for the sake of convenience that the light energy radiated on the respective detecting parts a to d is proportional to the area section orthogonal to the center shaft.

If the center shaft of the optical beam, referred to as the center shaft hereinafter, corresponds to the intersecting point 0, $\Delta x$ and $\Delta y$ are respectively zero. That is, if the center shaft is not shifted, the section of the optical beam orthogonal to the center shaft is divided into four parts. Thus, light amounts each corresponding to one-fourth of the area are respectively radiated on each of the detecting parts a to d, and respective outputs $A_0$ to $D_0$ of the detecting parts a to d have the same value K.

As mentioned above, if the center shaft is not shifted, the following equation can be established:

$$A_0 = B_0 = C_0 D_0$$

The value generated by calculating the difference between the sum of the outputs of the detecting parts a and c and the sum of the outputs of the detecting parts b and d corresponds to the focus error. The focus error indicates an offset amount of the focus according to the astigmatism method.

The focus error FE(1), if the center shaft is not shifted, is indicated by the following equation:

$$FE(1) = (A_0 = C_0) - (B_0 = D_0) \quad (1)$$

On the other hand, the focus error FE(2), if the center shaft is shifted, is indicated by the respective outputs A to D of the detecting parts a to d as follows:

$$FE(2) = (A+C) - (B-D) \quad (2)$$

Figure 1A:
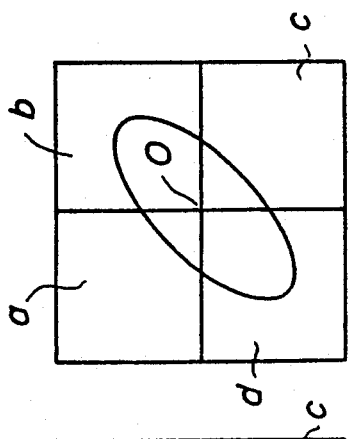
FIGS. 1A to 1F respectively show views of radiated surfaces of an optical beam radiated on detecting parts on a photosensor used for the focus servocontrol.
Figure 1B:
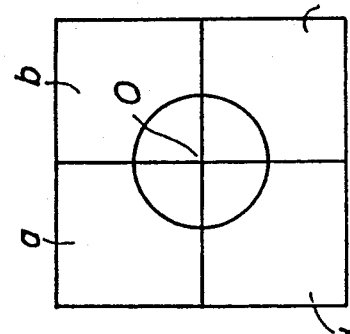
Figure 1C:
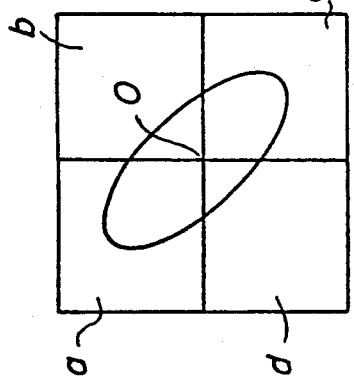
Figure 1D:
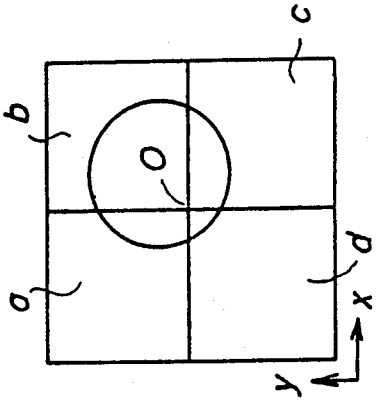
Figure 1E:
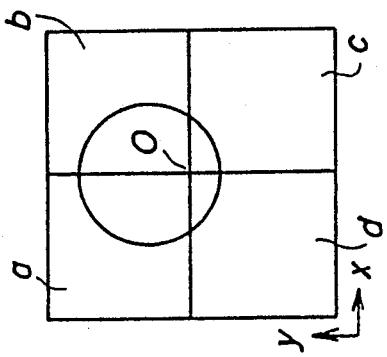
Figure 1F:
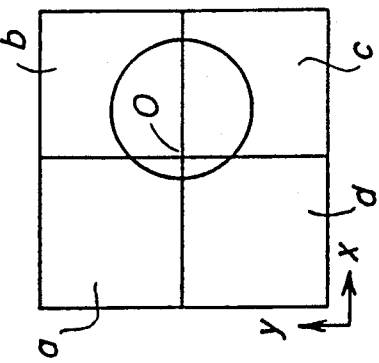

As shown in FIGS. 1A and 1C, only if the offset amount of the focus, which corresponds to the difference between the long radius and the short radius of the ellipse, is much smaller than the circular radius on the respective detecting parts a to d of the optical beam and, in addition, the offset amount of the center shaft is very small so that the $\Delta x$ and $\Delta y$ can be much smaller than the diameter of the circle of the optical beam at the radiated surface on the respective detecting parts a to d, can the first difference between FE(1) and FE(2) in which there is a focus offset as shown in FIG. 1A, be approximately the same as the second difference therebetween in which there is not a focus offset as shown in FIG. 1B.

Even in FIGS. 1A and 1C, it may be said that the difference between FE(1) and FE(2) is generated from the offset of the center shaft. If it is assumed that the difference between FE(1) and FE(2) corresponds to the offset amount of the center shaft, the control signal corresponding to the offset amount of the focus in which the shaft offset is corrected can be calculated by subtracting the value of the focus error from the above difference.

In addition, likewise, even if the light amount distribution offset is not zero, but only if the offset amount is much smaller than the diameter of the circle of the section of the optical beam, the difference between the FE(1) and FE(2) can be considered to be the light amount distribution offset at the section of the optical beam. Even in this case, the control signal in which the light amount distribution offset is corrected can be calculated by subtracting the value of the focus error from the above difference.

If it is assumed that the light amount of the optical beam radiated on the respective detecting parts a to d is proportional to the radiated area, a value of the FE(2) is approximately four times as large as the area of a duplicate part $\Delta FE$ between the oblique line areas $X_s$ and $Y_s$ shown in FIG. 3C, if $\Delta x$ and $\Delta y$ are respectively much smaller than the diameter of the circle at the section of the optical beam.

Therefore, by calculating the area of $\Delta FE$, the offset of the center shaft and the light amount distribution offset (referred to as the light amount distribution offset) included in the control signal are corrected as follows.

First, the offset amount $X_s$ in the direction x is calculated by the difference between the area of a left semicircle and that of a right semicircle in the circular section of the optical beam shown in FIGS. 3A-3C, as follows:

$$X_s = (A+D) - (B+C) \quad (3)$$

Second, the offset amount $Y_s$ in the direction y is calculated by the difference between the area of an upper semicircle and that of a lower semicircle in the circular section of the optical beam shown in FIGS. 3A-3C, as follows:

$$Y_s = (A+B) - (C+D) \quad (4)$$

If $\Delta x$ and $\Delta y$ are respectively smaller than the diameter of the circular section of the optical beam, Xs is proportional to $\Delta x$ and Ys is proportional to $\Delta y$. FE is expresses as x*y. Therefore, the following equations may be established.

$$FE \alpha \Delta x \alpha X_s \quad (5)$$

$$FE \alpha \Delta y \alpha Y_s \quad (6)$$

$$FE = \Delta x * \Delta y \alpha X_s * Y_s \quad (7)$$

Figure 4A:
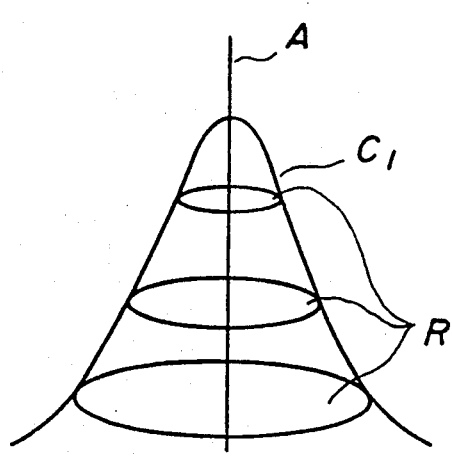
FIGS. 4A to 4C respectively show views of light amount distributions of the optical beam.
Figure 4B:
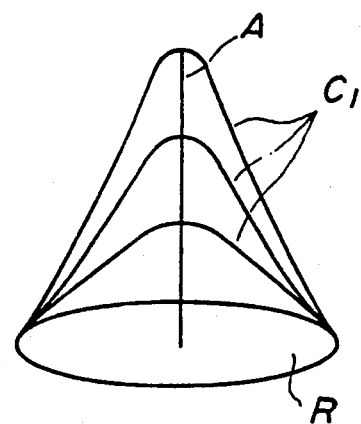

The above relationships can be established only if the light amount of the optical beam is proportional to the radiated area. But the virtual light amount distribution of the optical beam is approximately the same as a gauss distribution $C_1$ shown in FIGS. 4A-4C in which the light amount intensity I gradually decreases as the further section becomes apart from the optical axis A of the optical beam. In addition, the light amount distribution of the optical beam differs, as shown in FIGS. 4A and 4B, in accordance with a diameter of the lens through which the optical beam emitted from the laser diode 12 and/or a diameter of the optical beam etc.

Figure 4C:
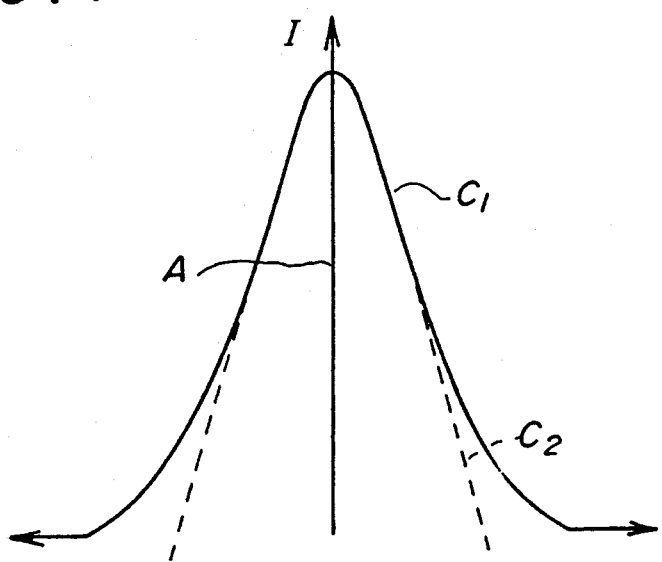

Accordingly, $\Delta FE$, referred to as a control signal error hereinafter, is approximated as follows since the light amount distribution characteristic around the optical axis of the optical beam can be approximated to a secondary curve $C_2$ shown in FIG. 4C.

$$\Delta FE = K * \sqrt{X_s * Y_s} \quad (8)$$

Hereupon, K is a constant established based on an external condition, such as the diameter of the lens and the diameter of the optical beam.

By calculating the equation (8), the control signal error by which the control signal can be corrected can be obtained.

Figure 5:
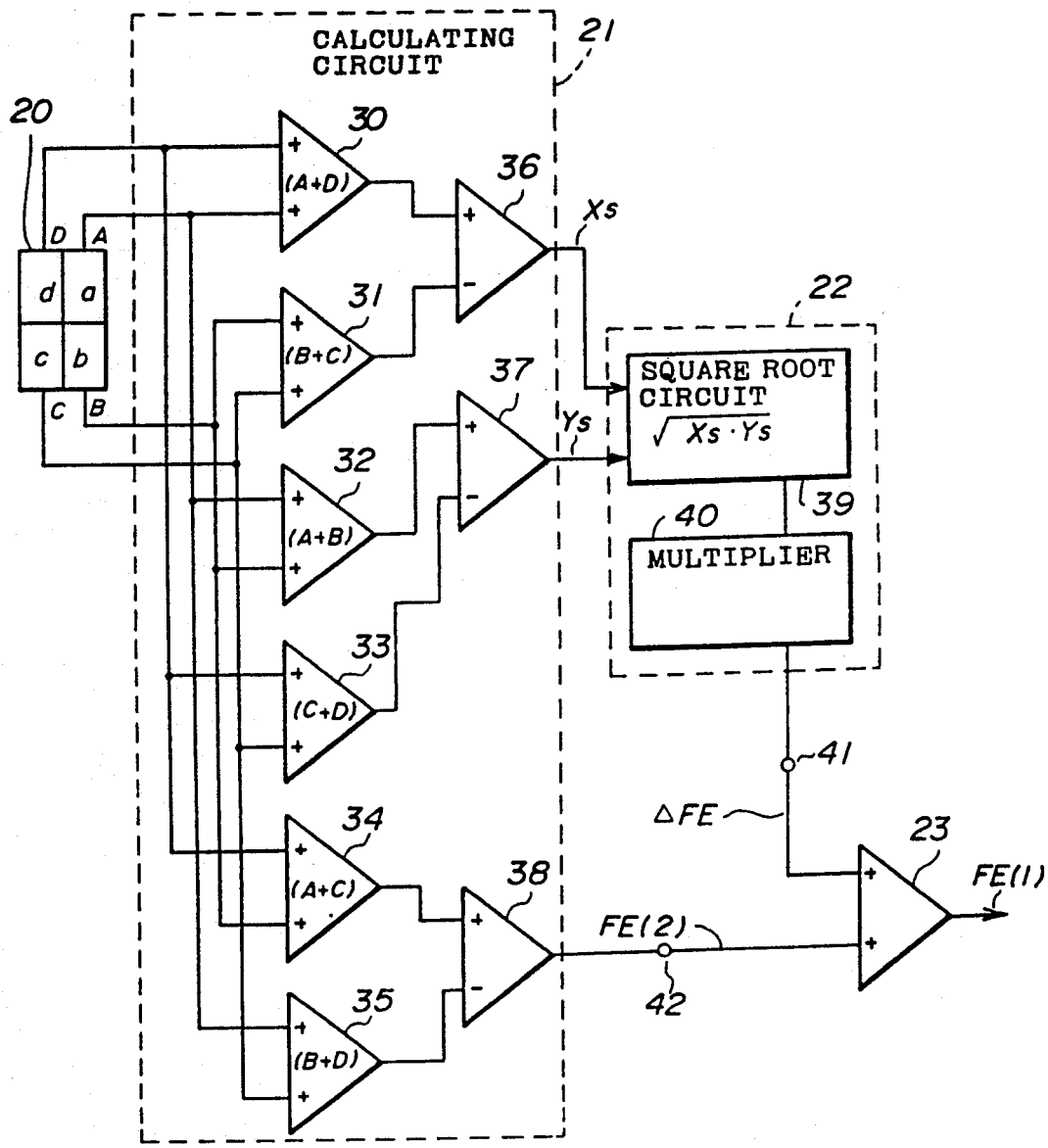
FIG. 5 shows a systematic block diagram of a circuitry system according to the present invention depicting the photosensor used for the focus servocontrol, first calculating means, fifth calculating means and sixth calculating means.

FIG. 5 shows a circuitry construction of the calculating circuits 21 and 22 shown in FIG. 2.

In FIG. 5, the calculating circuit 21 comprises adders 30 to 35 and subtracters 36 to 38.

The adder 30 adds A to D, which are the respective outputs of the detecting parts a and d of the photosensor 20, and outputs A+D. Likewise, the adder 31 outputs B+D, the adder 32 outputs A+B, the adder 33 outputs C+D, the adder 34 outputs A+D, and the adder 35 outputs B+D.

The subtracter 36 subtracts the output of the adder 31 from that of the adder 30, the subtracter 37 subtracts the output of the adder 33 from that of the adder 32, and the subtracter 38 subtracts the output of the adder 35 from that of the adder 34. Each of the outputs of the subtracters 36 to 38 respectively correspond to $X_s$ defined by the equation (3), $Y_s$ defined by the equation (4), and FE(2) defined by the equation (2).

The calculating circuit 22 comprises a square root circuit 39 and a multiplier 40.

The square root circuit 39 multiplies the output of the subtracter 36 by that of the subtracter 37, and calculates the square root of the result thereof. The multiplier 40 multiplies the variable constant K by the output of the square root circuit 39. The output of the calculating circuit 22 corresponds to the control signal error ΔFE defined by the equation (8).

The adder 23 outputs FE(1) defined by the equation (1) by adding the output of the subtracter 38 which is FE(2) defined by the equation (2) to the output of the calculating circuit 22 which is ΔFE defined by the equation (8).

The control signal based on the focus error is amplified by the amplifier 24, and then input into the objective lens driving coil 25 which moves the objective lens 16 in order to focus the optical beam on the recording surface of the optical disk 10.

Thus, an error of the focus servocontrol is corrected so that the focus offset is never generated from the light amount distribution offset and the optical disk storage 100 can maintain the desired recording/reproducing performance.

Figure 6:
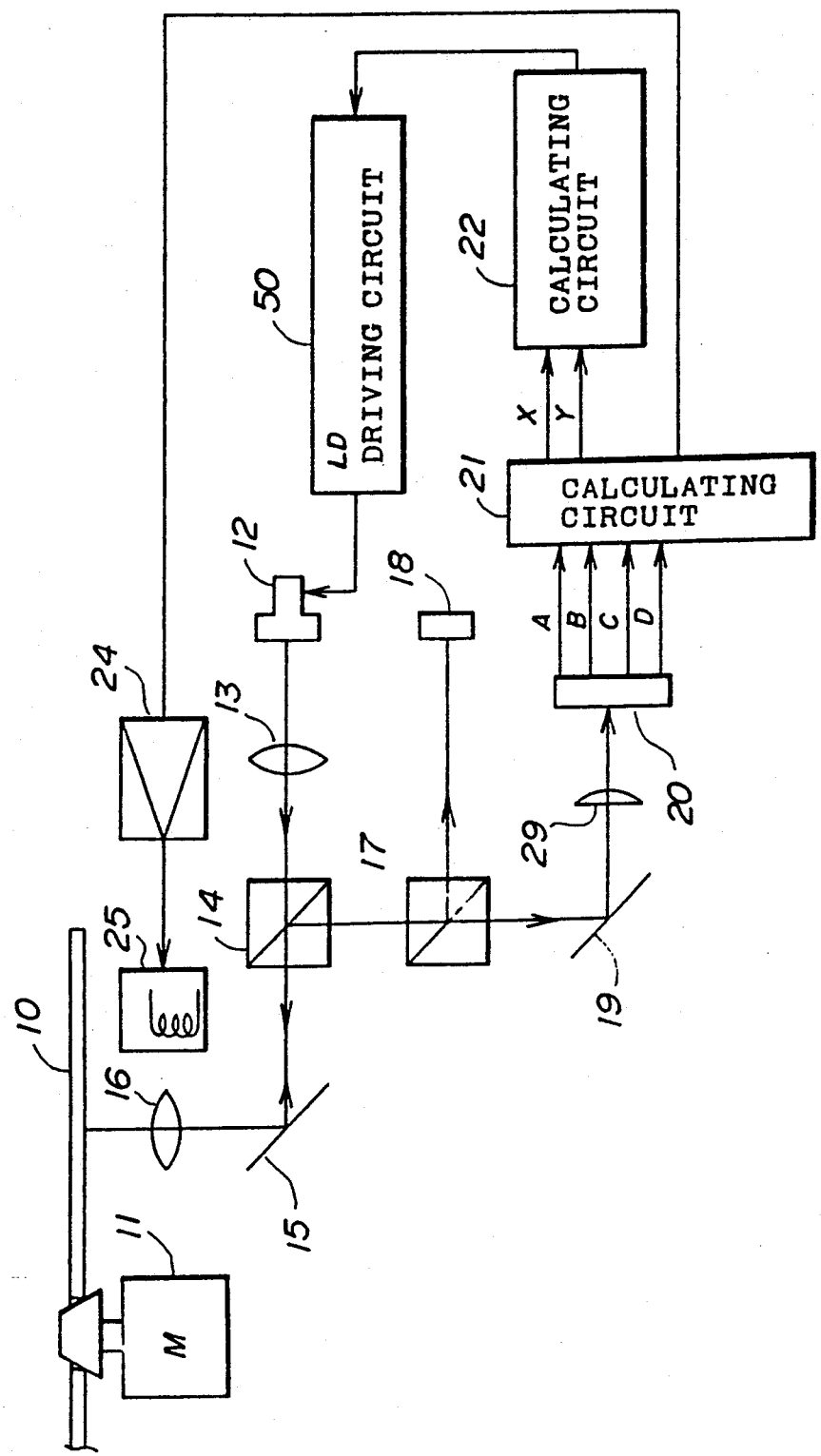
FIG. 6 shows a block diagram of an apparatus of the second embodiment according to the present invention.

FIG. 6 shows a block diagram of an apparatus of the second embodiment according to the present invention. Those elements in FIG. 6 which are the same as corresponding elements in FIG. 2 are designated by the same reference numerals, and a description thereof will be omitted.

In an optical disk storage 101 shown in FIG. 6, the control signal based on FE(2) of the focus error including an error generated by the light amount distribution offset defined by the equation (2) is directly supplied to the amplifier 24. Since the focus servocontrol is performed by the control signal including the error, the focus offset occurs.

On the other hand, the control signal error output from the calculating circuit 22 shown in FIG. 5 is supplied to an LD driving circuit 50 which is the optical beam controlling means. The LD driving circuit 50 controls the driving current of the laser diode 12 in accordance with an absolute value of the supplied control signal error.

As mentioned above, if there is a light amount distribution offset, the optical beam cannot be focused on the recording surface of the optical disk 10 because of the focus servocontrol based on the control signal including the error. The light energy supplied to the recording surface of the optical disk 10 becomes insufficient, and thus the optical disk storage can not properly perform recording/reproducing.

Accordingly, the light energy of the laser beam emitted from the laser diode 12 is controlled in accordance with the absolute value of the control signal error so that the light energy shortage on the recording surface of the optical disk 10 can be compensated. Thus, the optical disk storage 101 can continue to properly perform recording/reproducing since sufficient light energy is always supplied to the recording surface of the optical disk 10.

Figure 7:
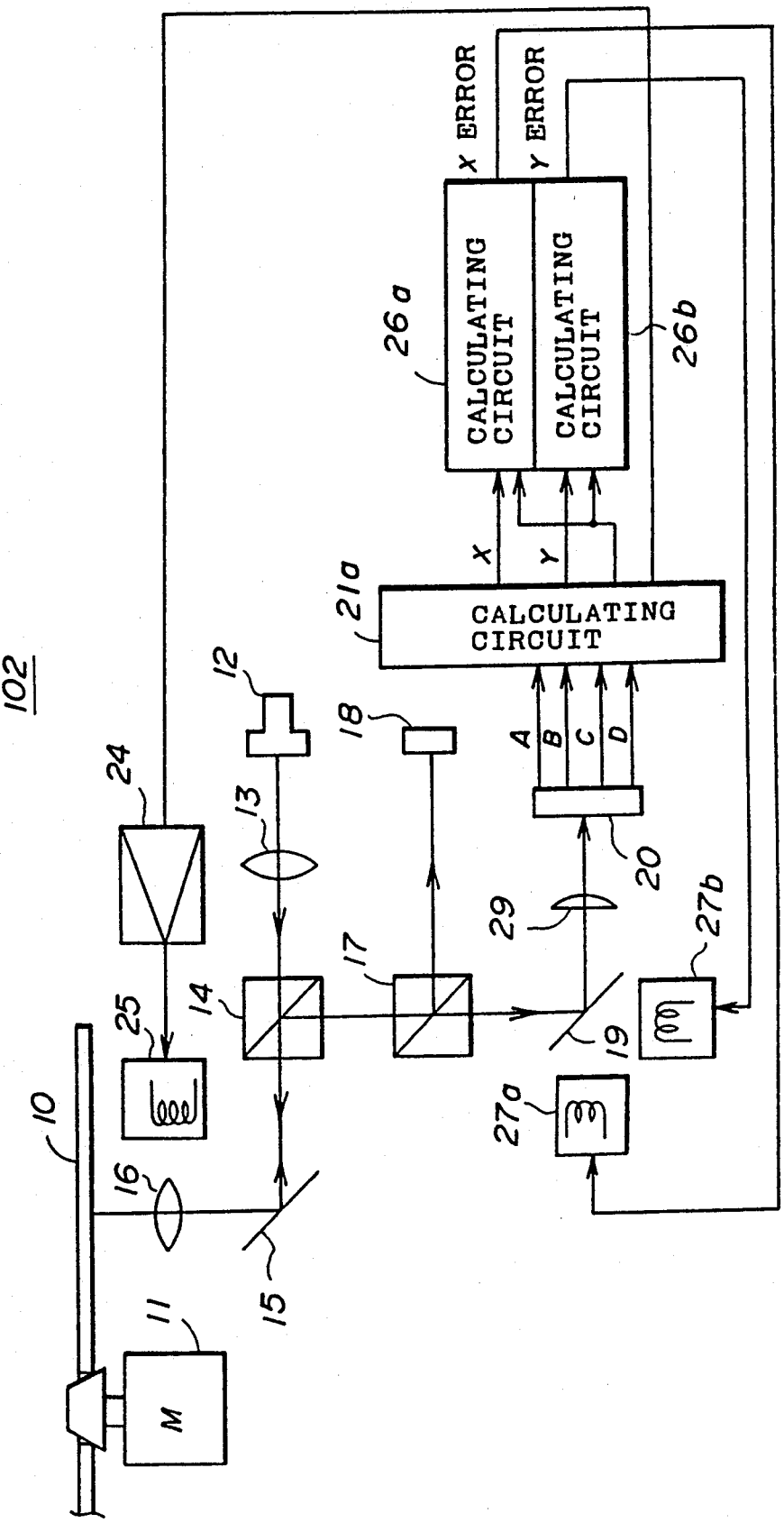
FIG. 7 shows a block diagram of an apparatus of the third embodiment according to the present invention.

FIG. 7 shows a block diagram of an apparatus of the third embodiment according to the present invention. Those elements in FIG. 7 which are the same as corresponding elements in FIG. 2 are designated by the same reference numerals, and a description thereof will be omitted.

Figure 8:
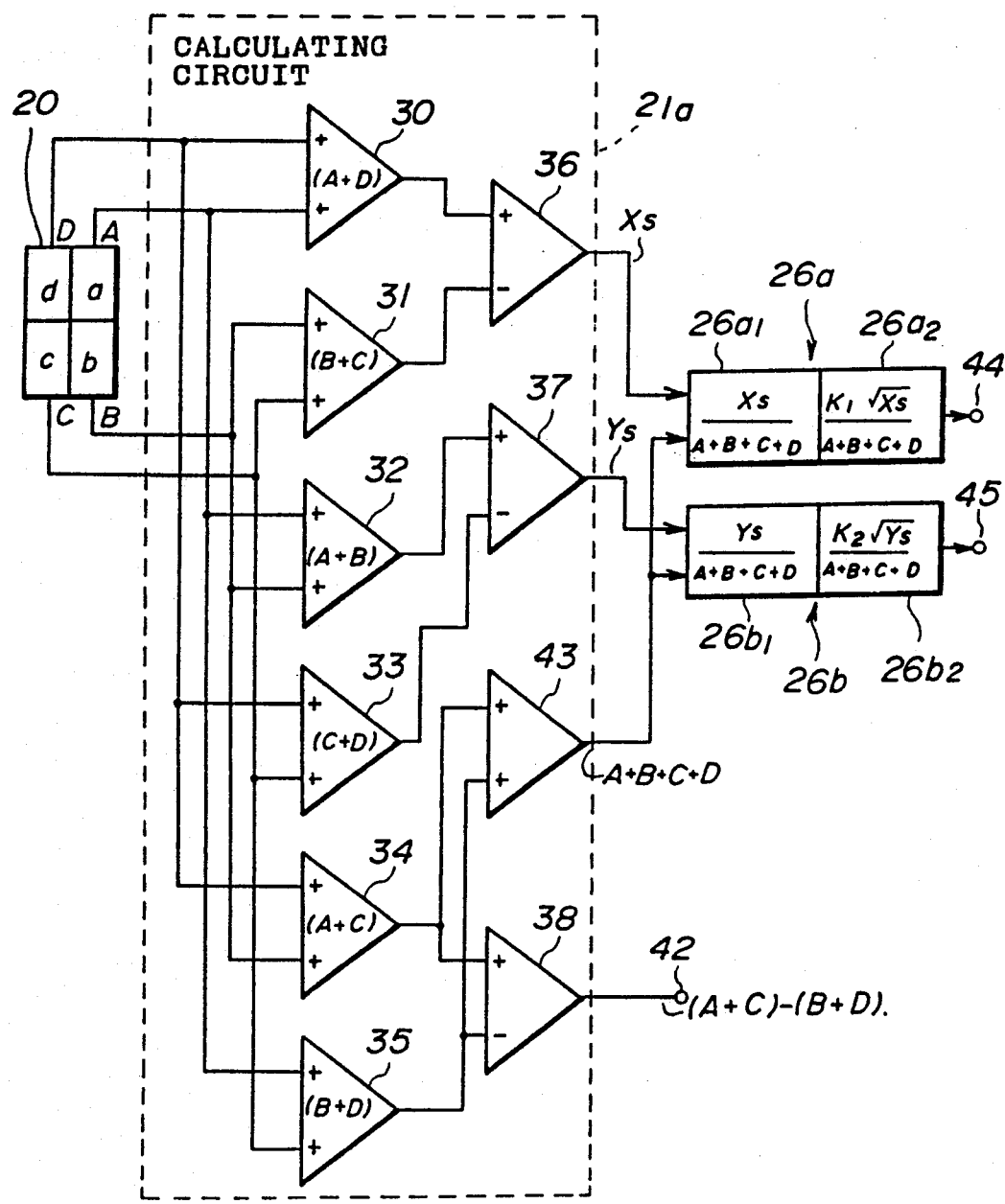
FIG. 8 shows a systematic block diagram according to the present invention depicting the photosensor used for the focus servocontrol, the first calculating means, eighth calculating means, and ninth calculating means.

In the optical disk storage 102 shown in FIG. 7, the output of the photosensor 20 is supplied to the calculating circuit 21a shown in FIG. 8, and the output of the calculating circuit 21a is supplied to calculating circuits 26a and 26b. Further, the respective outputs of the calculating circuits 26a and 26b are supplied to driving coils 27a and 27b as mirror driving means for controlling an angle of the mirror 19. Incidentally, those elements in the calculating circuit 21a which are the same as corresponding elements in the calculating circuit 21 are designated by the same reference numerals, and a description thereof will be omitted.

In the calculating circuit 21a shown in FIG. 8, an adder 43 adds the respective added values respectively output from the adders 34 and 35 to each other, the adder 34 adding the respective outputs of the detecting parts b and d to each other, and the adder 35 adding the respective outputs of the detecting parts a and c to each other. Then the adder 43 generates the sum of the outputs of the detecting parts a to d, that is $A+B+C+D$.

The divider $26a_1$ in the calculating circuit $26a$ divides the offset value $X_s$ in the direction x output from the subtracter 36 by $(A+B+C+D)$ output from the adder 43 in the calculating circuit $21a$ to generate $X_s/(A+B+C+D)$.

The circuit $26a_2$ generates an offset area ratio in the direction x as $K_1*\sqrt{X_s}/(A+B+C+D)$ by multiplying the output of the subtracter 36 by the constant $K_1$ and then dividing the same by the output of the adder 43.

Likewise, the divider $26b_1$ in the calculating circuit $26b$ divides the offset value $Y_s$ in the direction y by $(A+B+C+D)$ output from the adder 43 in the calculating circuit $21a$ to generate $Y_s/(A+B+C+D)$.

The circuit $26b_2$ generates an offset area ratio in the direction y as $K_2*\sqrt{Y_s}/(A+B+C+D)$ by multiplying the output of the subtracter 37 by the constant $K_2$ and then dividing the same by the output of the adder 43.

As is the same case with the square root circuit 39 shown in FIG. 5, square root is applied respectively to $X_s$ and $Y_s$ since the light amount distribution of the optical beam is approximated to the secondary curve. In addition, the constants $K_1$ and $K_2$ are respectively, as is the same case with the constant K, variable constants based on the light amount distribution characteristic of the optical beam radiated on the photosensor 20. The light amount distribution characteristic depends on the characteristics of the laser diode 12 and lenses 13, 16 and 29.

Those values output from the calculating circuits $26a$ and $26b$ are respectively supplied to the driving coils $27a$ and $27b$ for the mirror 19 shown in FIG. 7. The respective driving coils $27a$ and $27b$ each adjusts an angle of the mirror 19 to control the angles in, respectively, the directions x and y of the optical beam supplied to the photosensor 20 via the cylindrical lens 29. In addition, the driving coils $27a$ and $27b$ adjust the angle of the mirror 19 in accordance with the offset area ratio in the directions x or y.

The light amount distribution offset is expressed as the numerical offset area ratios in the directions x and y, by which the driving coils $27a$ and $27b$ controls the mirror 19. Thus, the light amount distribution offset of the optical beam supplied to the photosensor 20 can be substantially corrected and the error of the focus servocontrol can be eliminated.

FIG. 9 shows a block diagram of the optical disk storage of the fourth embodiment according to the present invention. Those elements in FIG. 9 which are the same as corresponding elements in FIG. 8 are designated by the same reference numerals, and a description thereof will be omitted.

In an optical disk storage 103, driving coils 28a and 28b, which comprises the photosensor driving means for driving the position of the photosensor 20, control the position of the photosensor 20 in both directions x and y in accordance with the offset area ratios in the directions x and y in order to correct the light amount distribution offset of the optical beam radiated on the photosensor 20.

Thus, the optical disk storages having a focus servocontrol system in accordance with the astigmatism method detects the focus error caused by the light amount distribution offset of the optical beam radiated on the photosensor used for the focus servocontrol, and eliminates the focus error by correcting a predetermined part of the optical system in accordance with the detected focus error. Therefore, the present invention is applicable to the optical disks having an either combined or separate optical system.

Incidentally, the storage apparatus according to the present invention can have recording means for recording data on the recording area of the optical disk.

In addition, even if the optical beam is radiated on a border between adjacent recording pits on the recording surface of a rewritable optical disk and the shape of a section of the reflected optical beam is deformed, the light amount distribution offset caused by the deformed shape is detected and corrected by detecting the focus error.

According to the present invention, even if the light amount distribution offset occurs, the focus error never occurs, so that the desired focus servocontrol can be achieved. Thus, the optical disk storage can properly perform recording/reproducing since sufficient light energy is always supplied to the recording surface of the optical disk 10.

Further, the present invention is not limited to these preferred embodiments, as various variations and modifications may be made without departing from the scope of the present invention.

What is claimed is:

1. An optical disk storage comprising:
   optical beam generating means for generating an optical beam;
   a first lens which focuses the optical beam generated from said optical beam generating means toward an optical disk having a radiation surface so that the optical beam can be focused on the radiation surface of the optical disk;
   a second lens which focuses the optical beam reflected from the optical disk so that a section of the optical beam, which is orthogonal to an optical axis of the optical beam, is distorted differently in accordance with a distance along the optical axis from said second lens;
   means for directing the optical beam reflected from the optical disk to said second lens;
   a photosensor having a radiation surface on which the optical beam focused via said second lens is radiated, the photosensor generating an output in accordance with a light amount distribution of the optical beam radiated on the radiation surface of said photosensor;
   first calculating means for detecting how the section of the optical beam radiated on the photosensor, which is othogonal to the optical axis, is distorted, so as to detect a change of a length of an optical path of the optical beam, by means of the output generated by said photosensor, for calculating an error, in a direction along the optical axis, of a focus of the optical beam to be focused on the optical disk, and for generating a control signal representing the error;
   lens driving means for controlling said first lens, by means of the control signal output from said first calculating means, in order to change a distance between said first lens and the optical disk so that the optical beam can be focused on the radiation surface of the optical disk; and
   second calculating means for calculating, on the basis of the light amount distribution of the optical beam radiated on the radiation surface of said photosensor, an error in alignment of the optical axis of the optical beam radiated on the radiation surface of said photosensor with respect to said photosensor.

2. An optical disk storage according to claim 1, wherein said second calculating means comprises:
   a first calculating circuit which calculates an error in an alignment of the optical axis of the optical beam radiated on the radiation surface of said photosensor with respect to said photosensor in a first direction by means of the output generated from said photosensor;
   a second calculating circuit which calculates an error in the alignment of the optical axis of the optical beam radiated on the radiation surface of said photosensor with respect to said photosensor in a second direction different from the first direction by means of the output generated from said photosensor; and
   a third calculating circuit which calculates the error in the alignment of the optical axis of the optical beam radiated on the radiation surface of the photosensor with respect to said photosensor by means of the respective outputs of the first calculating circuit and the second calculating circuit.

3. An optical disk storage according to claim 1 further comprising third calculating means for eliminating the error in the alignment of the optical axis of the optical beam radiated on the radiation surface of said photosensor with respect to said photosensor, which error of the optical axis is obtained based on the light amount distribution of the optical beam radiated on the radiation surface of said photosensor, from the control signal generated based on the error between the focus of the optical beam radiated on the optical disk and the radiation surface of the optical disk in the direction along the optical axis, an output of said third calculating means being supplied to said lens driving means.

4. An optical disk storage according to claim 2 further comprising third calculating means for eliminating, by means of the output of said second calculating means, the error in the alignment of the optical axis of the optical beam radiated on the radiation surface of said photosensor with respect to said photosensor, which error of the optical axis is obtained based on the light amount distribution of the optical beam radiated on the radiation surface of said photosensor, from the control signal generated based on the error between the focus of the optical beam radiated on the optical disk and the radiation surface of the optical disk in the direction along the optical axis, an output of said third calculating means being supplied to said lens driving means.

5. An optical disk storage according to claim 4, wherein said photosensor comprises four equal square detecting parts which are made by dividing a square; and
   wherein said first calculating means comprises:
   first adding means for adding respective outputs of two obliquely aligned detecting parts;

second adding means for adding respective outputs of the remaining two obliquely aligned detecting parts; and first subtracting means for calculating the difference between respective outputs of the first and second adding means, and wherein the first calculating circuit comprises:

third adding means for adding respective outputs of two longitudinally aligned detecting parts;

fourth adding means for adding respective outputs of the remaining longitudinally aligned detecting parts; and second subtracting means for calculating the difference between respective outputs of the third and fourth adding means, and wherein the second calculating circuit comprises:

fifth adding means for adding respective outputs of two horizontally aligned detecting parts;

sixth adding means for adding respective outputs of the remaining two horizontally aligned detecting parts; and third subtracting means for calculating the difference between respective outputs of the fifth and sixth adding means, and wherein the third calculating circuit comprises:

square root calculating means for calculating the square root of the result of multiplying respective outputs of the second subtracting means and the third subtracting means; and multiplying means for multiplying an output of the square root calculating means by a predetermined numeric value, and wherein said third calculating means comprises seventh adding means for adding respective outputs of the multiplying means of the third calculating circuit and the first subtracting means of the first calculating means.

6. An optical disk storage according to claim 2 further comprising optical beam control means for controlling an output of said optical beam generating means in accordance with the output of the third calculating circuit.

7. An optical disk storage according to claim 6, wherein said photosensor comprises four equal square detecting parts which are made by dividing a square; and wherein said first calculating means comprises:

first adding means for adding respective outputs of two obliquely aligned detecting parts;

second adding means for adding respective outputs of the remaining two obliquely aligned detecting parts; and first subtracting means for calculating the difference between respective outputs of the first and second adding means, and wherein the first calculating circuit comprises:

third adding means for adding respective outputs of two longitudinally aligned detecting parts;

fourth adding means for adding respective outputs of the remaining longitudinally aligned detecting parts; and second subtracting means for calculating the difference between respective outputs of the third and fourth adding means, and wherein the second calculating circuit comprises:

fifth adding means for adding respective outputs of two horizontally aligned detecting parts;

sixth adding means for adding respective outputs of the remaining two horizontally aligned detecting parts; and third subtracting means for calculating the difference between respective outputs of the fifth and sixth adding means, and wherein the third calculating circuit comprises:

square root calculating means for calculating the square root of the result of multiplying respective outputs of the second subtracting means and the third subtracting means; and multiplying means for multiplying an output of the square root calculating means by a predetermined numeric value.

8. An optical disk storage according to claim 2, wherein said second calculating means further comprises:

third calculating means for calculating a light amount of the optical beam radiated on the radiation surface of said photosensor based on the output of the photosensor; and wherein said third calculating circuit comprises:

fourth calculating means for adjusting the output of the first calculating circuit in accordance with an output of said third calculating means; and fifth calculating means for adjusting the output of the second calculating circuit in accordance with an output of said third calculating means; and said optical disk storage further comprises:

a mirror which changes an incident direction the optical beam reflected from the optical disk onto said second lens; and mirror driving means for adjusting a direction of said mirror in accordance with respective outputs of said fourth and fifth calculating means so that an error in the alignment of the optical axis of the optical beam radiated on the radiation surface of the photosensor with respect to said photosensor can be eliminated.

9. An optical disk storage according to claim 8, wherein said photosensor comprises four equal square detecting parts which are made by dividing a square; and wherein said first calculating means comprises:

first adding means for adding respective outputs of two obliquely aligned detecting parts;

second adding means for adding respective outputs of the remaining two obliquely aligned detecting parts; and first subtracting means for calculating the difference between respective outputs of the first and second adding means, and wherein the first calculating circuit comprises:

third adding means for adding respective outputs of tow longitudinally aligned detecting parts;

fourth adding means for adding respective outputs of the remaining longitudinally aligned detecting parts; and second subtracting means for calculating the difference between respective outputs of the third and fourth adding means, and wherein the second calculating circuit comprises:

fifth adding means for adding respective outputs of two horizontally aligned detecting parts;

sixth adding means for adding respective outputs of the remaining two horizontally aligned parts; and third subtracting means for calculating the difference between respective outputs of the fifth and sixth adding means, and wherein:

said third calculating means comprises a seventh adding means for adding respective outputs of said first adding means and said second adding means;

said fourth calculating means comprises square root, multiplying, and dividing means for calculating the square root of the output of said second subtracting means of said first calculating circuit, multiplying the result of the square root calculation by a second predetermined numeric value, and dividing the result of the multiplication by the output of said third calculating means; and said fifth calculating means comprises square root, multiplying and dividing means for calculating the square root of the output of said third subtracting means of said second calculating circuit, multiplying the result of the square root calculation by a third predetermined numeric value, and dividing the result of the multiplication by the output of said third calculating means.

10. An optical disk storage according to claim 2, wherein said second calculating means further comprises:

third calculating means for calculating a total light amount of the optical beam radiated on the radiation surface of said photosensor based on the output of the photosensor; and wherein said third calculating circuit comprises:

fourth calculating means for adjusting the output of the first calculating circuit in accordance with an output of said third calculating means; and fifth calculating means for adjusting the output of the second calculating circuit in accordance with an output of said third calculating means; and said optical disk storage further comprises:

photosensor driving means for adjusting a position of said photosensor in accordance with respective outputs of said fourth and fifth calculating means so that an error in the alignment of the optical axis of the optical beam radiated on the radiation surface of the photosensor with respect to said photosensor can be eliminated.

11. An optical disk storage according to claim 1, wherein said second lens comprises a cylindrical lens, one surface of which is a plane and the other surface of which is a cylinder.

12. An optical disk storage according to claim 1, wherein said photosensor further comprises four detecting parts which respectively generate output in accordance with light energy supplied from the optical beam radiated on the photosensor, each light energy supplied to each detecting part being equal to each other if the optical axis of the optical beam corresponds to an intersecting point of the four detecting parts.

13. An optical disk storage according to claim 12, wherein said photosensor comprises four equal square detecting parts which are made by dividing a square.

* * * * *